United States Patent
Wada

(10) Patent No.: US 6,751,038 B1
(45) Date of Patent: Jun. 15, 2004

(54) DATA WRITE CONTROL SYSTEM AND METHOD THEREFOR

(75) Inventor: Masamichi Wada, Higashimurayama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 323 days.

(21) Appl. No.: 09/869,348

(22) PCT Filed: Jun. 5, 2000

(86) PCT No.: PCT/JP00/03619

§ 371 (c)(1),
(2), (4) Date: Jun. 28, 2001

(87) PCT Pub. No.: WO01/33566

PCT Pub. Date: May 10, 2001

(30) Foreign Application Priority Data

Oct. 29, 1999 (JP) .......................................... 11-307893
Nov. 2, 1999 (JP) .......................................... 11-313151

(51) Int. Cl.[7] .................................................. G11B 5/09
(52) U.S. Cl. ............................ 360/53; 360/51; 711/112
(58) Field of Search .............................. 360/51, 25, 53; 369/48, 60, 45; 395/183.81, 575, 182.13; 711/112

(56) References Cited

U.S. PATENT DOCUMENTS

| 4,494,226 | A | 1/1985 | Hazel et al. .................. 369/45 |
| 5,379,414 | A | 1/1995 | Adams ........................ 395/575 |
| 5,406,533 | A | 4/1995 | Maeda ......................... 369/32 |
| 5,664,094 | A | 9/1997 | Taniwa et al. ......... 395/183.18 |
| 5,694,538 | A | 12/1997 | Okazaki et al. ........ 395/183.13 |
| 5,761,410 | A | 6/1998 | Martin et al. ......... 395/183.18 |
| 5,822,513 | A | 10/1998 | Ofer et al. ............. 395/183.18 |
| 5,844,911 | A | * 12/1998 | Schadegg et al. ............. 714/42 |
| 6,452,735 | B1 | * 9/2002 | Egan et al. .................... 360/31 |

FOREIGN PATENT DOCUMENTS

| JP | 2-178723 | 7/1990 |
| JP | 6-139714 | 5/1994 |
| JP | 7-6072 | 1/1995 |

* cited by examiner

Primary Examiner—David Hudspeth
Assistant Examiner—Glenda P. Rodriguez
(74) Attorney, Agent, or Firm—Finnegan, Henderson, Farabow, Garrett & Dunner, L.L.P.

(57) ABSTRACT

The present invention relates to a data write control system for writing data onto a disk in response to a write request. Before the data is written onto a disk in a floppy disk drive (17), a FD driver (120) stores the data in a predetermined area of a main memory (12). Note that the data involves a probability of being unsuccessfully written onto the disk. After the data has been written on the disk, the FD driver (120) reads out the written data from the disk, and compares the read-out data with the data stored in the predetermined area so as to determine whether or not the data written onto the disk has been successfully written.

18 Claims, 5 Drawing Sheets

DATA WRITE CONTROL SYSTEM AND METHOD THEREFOR

TECHNICAL FIELD

The present invention relates to a data write control system and a method therefor and, more particularly, to a data write control system and a method therefor that are capable of avoiding a situation where the data destruction in a disk such as a floppy disk remains unknown.

BACKGROUND ART

In recent years, a computer system is generally provided with a hard disk drive (HDD) as a standardized component. A recording medium (magnetic disk) in the hard disk drive is not removable. To be convenient for a user to use a recording medium, a computer system provided with the hard disk drive is also provided with a floppy disk drive (FDD).

A floppy disk drive adapted to use a 1.44 MB floppy disk is generally designed to transfer and write 512 bytes of data in 8 ms for a sector. In other words, 1-byte data must be transferred and written in 16 $\mu$s. The data to be written is transferred to a floppy disk controller (FDC) in units of 1-byte by a DMA (direct memory access) controller (DMAC). That is, the bus of the computer system is occupied and released for each transfer of 1-byte data.

Meanwhile, in a computer system provided with a multi-task OS and adapted to process a plurality of applications in parallel, various bus-user devices (I/O devices) loaded in the computer system frequently issue interrupt requests (IRQ) and give rise to a severe contest for occupying the bus. When a data write operation for the floppy disk drive is carried out in the state where the system suffers an extraordinarily heavy load, it is not always possible to surely occupy the bus at good timing for transferring 1-byte data in 16 $\mu$s.

If such is the case, DMA underrun (or DMA overrun) may occur. Conventionally, however, the probability that data of succeeding sectors may be destroyed because of such DMA underrun occurrence has not been taken into consideration.

DISCLOSURE OF INVENTION

Accordingly, it is an object of the present invention to provide a data write control system and a method therefor that are capable of efficiently avoiding a situation where the destruction of data in a disk such as a floppy disk remains unknown.

It is another object of the present invention to provide a data write control system and a method therefor that are capable of efficiently checking and securing data in sectors succeeding to the last sector of sectors targeted for writing, even if DMA underrun has occurred on the last byte of the last sector.

It is still another object of the present invention to provide a data write control system and a method therefor that are capable of efficiently protecting data in a sector located next to the last sector of sectors targeted for writing, from being destroyed, even if DMA underrun has occurred on the last byte of the last sector.

According to an aspect of the present invention, there is provided a data write control method for writing data onto a disk in response to a write request, comprising the steps of: storing the data in a predetermined area, the data involving a probability of being unsuccessfully written onto a disk; writing the data onto the disk; reading out the written data from the disk; and comparing the read-out data with the data stored in the predetermined area so as to determine whether or not the data written onto the disk has been successfully written.

According to another aspect of the present invention, there is provided a data write control system for writing data onto a disk in response to a write request, comprising: means for storing the data in a predetermined area before the data is written onto a disk, the data involving a probability of being unsuccessfully written onto the disk; means for, after the data has been written on the disk, reading out the written data from the disk; and means for comparing the read-out data with the data stored in the predetermined area so as to determine whether or not the data written onto the disk has been successfully written.

According to still another aspect of the present invention, there is provided a storage medium storing computer-executable program code that performs data write control in writing data onto a disk in response to a write request, the program code comprising: means for causing a computer to store data in a predetermined area, the data involving a probability of being unsuccessfully written onto a disk; means for causing a computer to write the data onto the disk; means for causing a computer to read out the written data from the disk; and means for causing a computer to compare the read-out data with the data stored in the predetermined area so as to determine whether or not the data written onto the disk has been successfully written.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention in which.

BEST MODE FOR CARRYING OUT THE INVENTION

Now, the present invention will be described in greater detail by referring to the accompanying drawings that illustrate preferred embodiments of the present invention.

Figure 1:
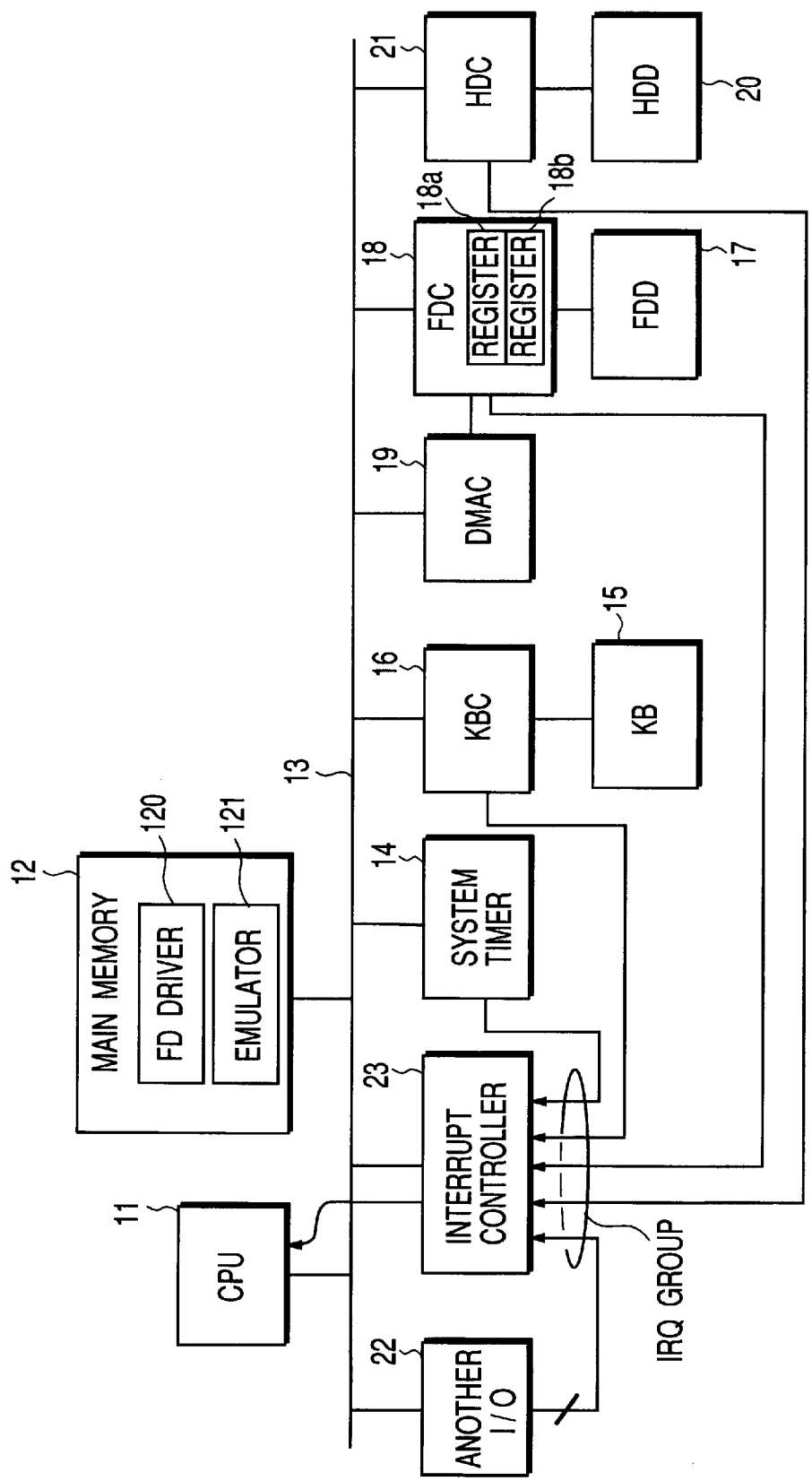
FIG. 1 is a schematic block diagram of a computer system to which the first an second embodiments of the present invention are applicable.

FIG. 1 is a schematic block diagram of a computer system to which both the first embodiment and the second embodiment of the present invention are applicable.

The computer system of FIG. 1 includes a CPU 11 for controlling the operation of the system, an OS (Operating System), an application program to be run by the computer and a main memory 12 for storing the user data prepared by the application program. The CPU 11 has a function of trapping the I/O (input/output) command issued by the application program or the like. The CPU 11 and the main memory 12 are connected to a bus 13.

A system timer 14, a keyboard controller (KBC) 16, a floppy disk controller (FDC) 18, a DMA controller (DMAC) 19, a hard disk controller (HDC) 21, various I/O devices 22 and an interrupt controller 23 are also connected to the bus 13.

The system timer 14 is a programmable interval timer (PIT) and normally generates an interrupt request (IRQ) at regular intervals of standardized 55 ms. The interval of generating an interrupt request is programmable and a value smaller than 55 ms may be selected for the purpose of high speed task switching depending on the OS environment. The priority of an interrupt request from the system timer 14 is ranked to be the highest in the system.

The keyboard controller 16 controls key input operations of the keyboard (KB) 15.

The floppy disk controller 18 controls data write/read operations for floppy disk drive (FDD) 17 in accordance with the I/O command from the CPU 11. The floppy disk controller 18 contains a status register 18a and a data register 18b. The status register 18a is used for temporarily storing the status of the controller 18 and various statuses concerning a read/write operation. The data register 18b is used for temporarily storing the result of a read/write operation.

The DMA controller 19 controls the DMA (direct memory access) transfer of data between the main memory 12 and an I/O device in accordance with the I/O command from the CPU 11. Particularly, the DMA controller 19 of this embodiment is adapted to control transfer of data specified by the CPU 11 to be read/written from/to the floppy disk drive 17. The DMA controller 19 has a DMA counter (not shown) that is used to initially set an amount of data (the number of bytes of data) to be transferred, and to decrement by, e.g., 1 each time 1-byte data is transferred.

The hard disk controller (HDC) 21 controls the operation of reading/writing data from/in the hard disk drive (HDD) 20 which stores the OS of the computer, various application programs, various driver programs and user data.

Among the programs (driver programs) stored in the hard disk drive 20, there is a floppy disk driver program (to be referred to as a FD driver hereinafter) 120. On the other hand, among the programs stored in the hard disk controller 21, there is a an emulation program (to be referred to as an emulator hereinafter) 121. The FD driver 120 and the emulator 121 are directly loaded in the main memory 12 as shown in FIG. 1.

The various I/O devices 22 of the computer system include a sound controller, a serial port and an SCSI port.

The interrupt controller 23 is adapted to receive interrupt requests (IRQ) that may be issued from the system timer 14, the keyboard controller 16, the floppy disk controller 18, the hard disk controller 21 or the various I/O devices 22 and control the reception of the interrupt requests according to their priorities. The status information indicating the received interrupt requests is stored in the registers (not shown) contained in the interrupt controller 23, so that interrupt requests (or issuers of the interrupt requests) may be identified as the information is read out by the CPU 11.

Now, the processing operation according to the first embodiment of the present invention will be described below.

Figure 2:
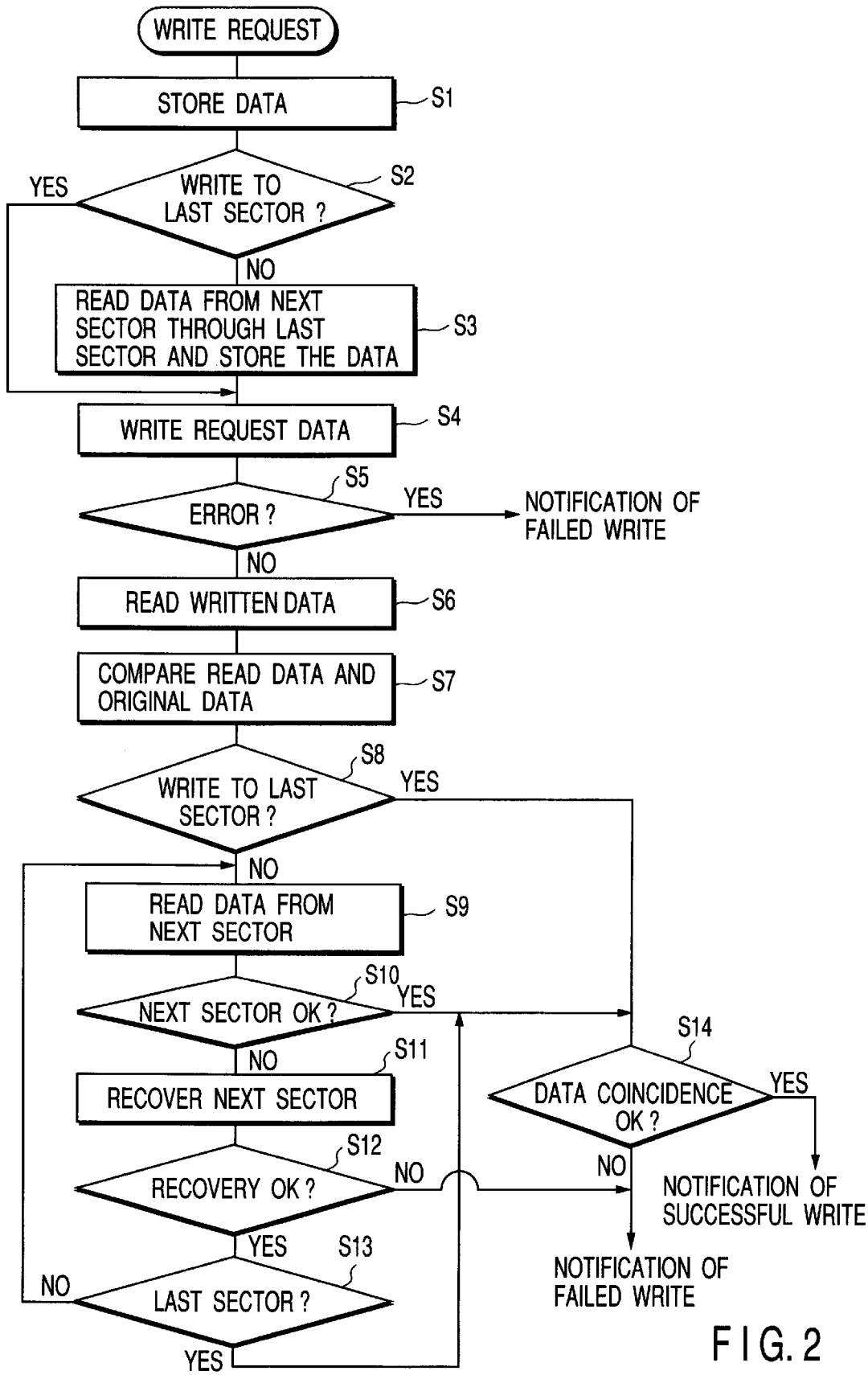
FIG. 2 is a flow chart illustrating the operational sequence of writing data in a floppy disk drive according to the first embodiment of the present invention.

When a write request for writing data in the floppy disk drive 17 is issued from a certain application program stored in the main memory 12 of the computer system, a processing operation is carried out by the CPU 11 which follows the FD driver 120, as shown in a flow chart of FIG. 2.

First, the CPU 11 issues a command to the DMA controller 19 for transferring the data, which is to be written according to the write request, to a predetermined memory area of the main memory 12, thereby causing original data to be stored in the predetermined memory area of the main memory 12 (Step S1), before writing the data in the floppy disk drive 17.

The CPU 11 determines whether or not the write request from the application program contains a designation for a last sector of a track (Step S2).

If the write request does not contain the designation for the last sector of a track, DMA underrun may occur on the last byte of the data to be written. In order to cope with such a situation, the CPU 11 issues a command to the floppy disk controller 18 for reading data stored in all sectors which starts from a sector located next to the last sector of sector(s) targeted for writing and ends at the last sector of the same track. At the same time, the CPU 11 issues a command to the DMA controller 19 for transferring the read-out data to a predetermined memory area of the main memory 12 (Step S3).

The CPU 11 controls the floppy disk controller 18 and the DMA controller 19 to execute the requested write operation immediately in the case where the write request does not contain the designation for the last sector of a track, while the CPU 11 controls the floppy disk controller 18 and the DMA controller 19 to execute the requested write operation after carrying out Step S3 in the case where the write request contains the designation for the last sector of a track (Step S4).

After writing data in the floppy disk drive 17 according to the command from the CPU 11, the floppy disk controller 18 stores the current status in the status register 18a in the controller 18 and issues an interrupt request to the interrupt controller 23. Upon receipt of the interrupt request, the interrupt controller 23 outputs an interrupt signal to the CPU 11 and stores the information indicating that the corresponding interrupt request has issued from the floppy disk controller 18 in a register in the controller 23.

Then, the CPU 11 checks the register in the interrupt controller 23 in response to the interrupt signal from the controller 23 to detect that the interrupt request is issued from the floppy disk controller 18, and then reads the contents of the status register 18a of the floppy disk controller 18 so as to determine whether or not there is a write error (Step S5).

If the write error has been detected, the CPU 11 notifies the failure of the write operation to the application program that has originally issued the write request. If, on the other hand, no write error has been detected, the CPU 11 controls the floppy disk controller 18 and the DMA controller 19 to read the data written in Step S4 so as to store in a predetermined memory area of the main memory 12 (Step S6).

Then, the CPU 11 compares the data stored in Step S6 with the original data prior to being written in the floppy disk drive 17 in Step S4 (i.e., original data requested to be written from the application program), and stores flag information indicating coincidence or non-coincidence in a predetermined memory area of the main memory 12 (Step S7).

The flag information represents if the data requested to be written from the application program has been correctly written or not. The flag information is used in Step S14 (which will be described later) to determine whether or not the write operation has successfully been carried out.

Figure 3:
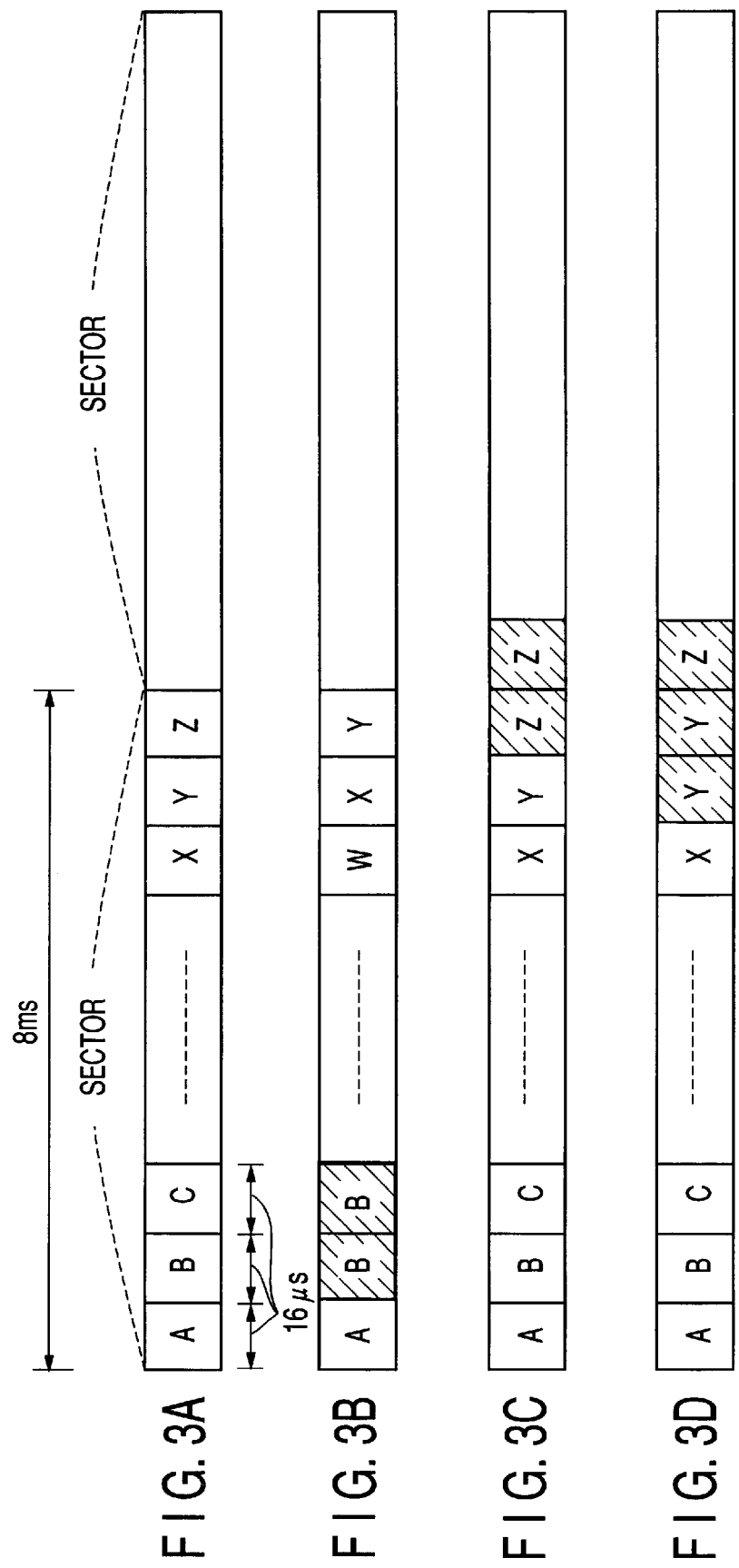
FIGS. 3A to 3D are schematic illustrations for explanation of DMA underrun occurrences.

In the case where the above-described flag information indicates coincidence, byte mode data, e.g., A, B, C, . . . , x, Y, z may have been written in a target sector of the floppy disk, as shown in FIG. 3A or FIG. 3C. On the other hand, in the case where the flag information indicates non-coincidence, the data B that immediately succeeds the data A may have been erroneously written twice in succession as shown in FIG. 3B, or the data Y that immediately precedes the data Z may have been erroneously written twice in succession as shown in FIG. 3D.

Each of the situations shown in FIGS. 3B to 3D represents DMA underrun occurrence caused in an extreme load condition of the system, in which byte mode data has not been transferred concisely in a predetermined time unit of, e.g., 16 μs depending on the congestion of the bus.

The DMA underrun represented in FIG. 3B can be detected by the floppy disk controller 18 and a status indicating the DMA underrun occurrence is stored in the status register 18a, so that the DMA underrun can be easily detected by the floppy disk driver 17 that reads the status register 18a of the controller 18 and no real problem will arise therefrom.

However, if the transfer of the 1-byte data Z (which should be written in a last byte position of a last sector of sectors targeted for writing) is not completed within the 16 μs and written in a next (succeeding) sector as shown in FIG. 3C or if the data Y or the like is erroneously written twice in succession as shown in FIG. 3D, and hence the last 1-byte data Z is written in a next sector, then there occurs a problem that the DMA underrun is not be detected by the floppy disk controller 18 and the DMA underrun can not be detected by the floppy disk driver 17, with the result that the data destruction in the next sector remains is unknown.

Accordingly, the CPU 11 carries out processing operations for checking and securing data in sectors, as described below (Steps S8 to S14).

First, the CPU 11 determines whether or not the write request contains a designation for the last sector of a track (Step S8).

If the write request contains a designation for the last sector of a track, the possible DMA underrun of the last byte does not need to be taken into consideration. It is to be noted that, however, data may have been erroneously written in the write target sector at Step S4 as shown in FIG. 3B, so that the CPU 11 proceeds to Step S14 to determine whether or not the write operation has successfully been carried out.

If, on the other hand, the write request does not contain a designation for the last sector of a track, the CPU 11 controls the floppy disk controller 18 and the DMA controller 19 to read out data (written in Step S4) of a next sector which is immediately succeeding to the last byte of sector(s) targeted for writing (Step S9), and compares the read-out data with corresponding data of the next sector already stored in the predetermined memory area of the main memory 12 in Step S3 so as to determine whether or not the data of the next sector has been destroyed (Step S10).

If the data of the next sector has not been destroyed, the CPU 11 proceeds to Step S14. If, on the other hand, the data of the next sector has been destroyed, it is considered that DMA underrun has occurred as a result of the transfer of the last byte to a sector preceding the next sector as shown in FIG. 3C or FIG. 3D. Then, the CPU 11 carries out a processing operation for recovering the data of the next sector, by writing the data stored in the predetermined memory area of the main memory 12 in Step S3 above in the next sector (Step S11).

Then, the CPU 11 determines whether or not the data of the next sector has been properly recovered (Step S12). That is, the CPU 11 controls the floppy disk controller 12 and the DMA controller 19 to read the data of the next sector and compares the data of the next sector with the data read out from the next sector (i.e., the data stored in the predetermined memory area of the main memory 12 in Step S3) to determine whether or not the recovery of the data of the next sector has been successfully carried out.

If the attempt for recovering the data of the next sector ended in failure, the CPU 11 notifies the application program that has issued the write request of the failure regardless of the state as to whether the written data is correct.

If, on the other hand, the attempt for recovering the data of the next sector succeeded, the CPU 11 determines whether or not the next sector is the last sector of the track (Step S13).

If the next sector whose data has been successfully recovered is the last sector of the track, it is considered that no DMA underrun would have occurred on the last byte of the next data in the recovery for the next data (i.e., in writing the original data in the next sector). It is to be noted that, however, data may have has been erroneously written in the write target sector at Step S4 as shown in FIG. 3D, so that the CPU 11 proceeds to Step S14 to determine whether or not the write operation has successfully If, on the other hand, the next sector whose data has been successfully recovered is not the last sector of the track, DMA underrun may have occurred on the last byte of the next sector in the recovery for the next data (i.e., in writing the original data in the next sector). Then, the CPU 11 follows Steps S9, S10, and succeeding steps, dealing with a sector immediately succeeding to the next sector as if it were the next sector. The recovering operation in Step 11 is repeated until the data of a succeeding sector is determined to be correct or until data of the last sector of the track is recovered.

Now, if it is determined that the write request contains a designation for the last sector of the track in Step S8, or that the data of the next sector is correct in Step S10, or that the next sector whose data has been successfully recovered is the last sector of the track in Step S13, i.e., if it is determined that there is no sector between the next sector and the last sector of the track where the data has been destroyed by DMA underrun and has not been recovered, the CPU 11 then proceeds to Step S14.

In Step S14, the CPU 11 refers to flag information representing the result of the data comparison in Step S7. If the flag information indicates coincidence (i.e., if the written data is correct), the CPU 11 notifies the application program that issued the write request of the fact that the write operation has successfully been carried out. If, on the other hand, the flag information indicates non-coincidence (i.e., if the written data is incorrect), the CPU 11 notifies the application program of the fact that the write operation has failed.

Thus, with the above described embodiment, in the case where the sector to be used for writing data according to a write request is not the last sector of a track, the successful completion of the data writing operation is notified to the application program which is the issuer of the write request when the data of the next sector is correct or when the data of the next sector has been recovered and the written data is correct. On the other hand, the application program is notified of a failed write operation when the data of the next sector is incorrect or when the data of the next sector has been recovered but the written data is incorrect. Additionally, the application program is also notified of a failed write operation regardless of the fact as to whether or not the written data of the next sector is incorrect and has not been recovered.

If, on the other hand, the sector to be used for writing data according to a write request is the last sector of a track, a successful or failed write operation will be notified to the application program simply based on whether or not the written data is correct because there is no probability of destroying the data of the next sector.

Next, the processing operation according to the second embodiment of the present invention will be described below.

Figure 4:
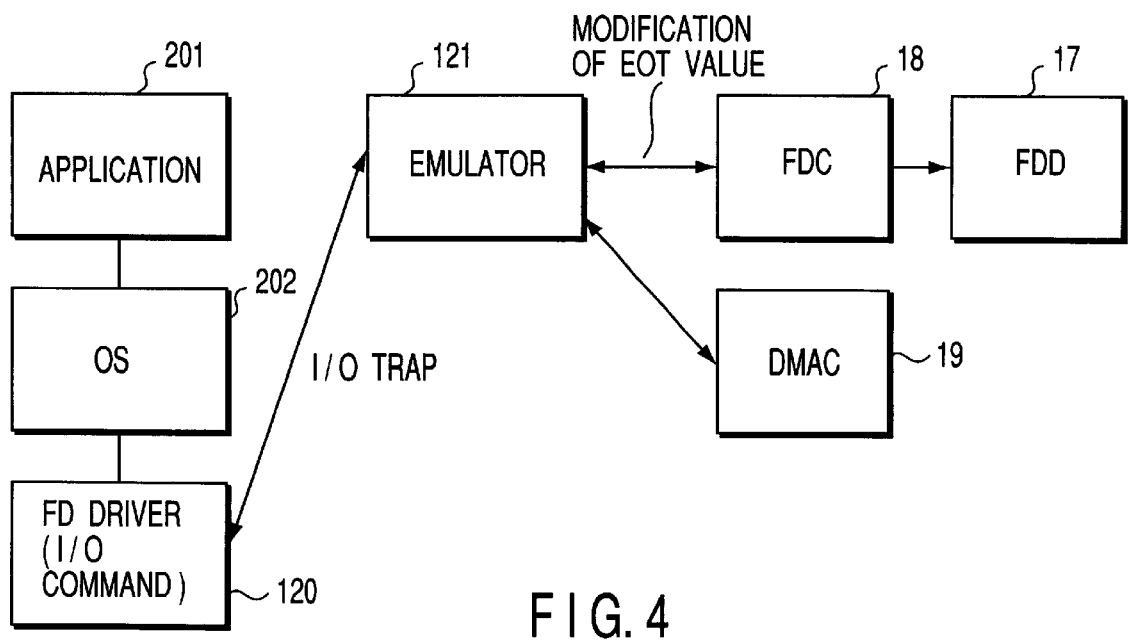
FIG. 4 is a schematic illustration of the function of a FD driver and an emulator according to the second embodiment of the present invention.

Features of FD driver 120 and that of emulator 121 according to the second embodiment will be described briefly by referring to FIG. 4.

Upon receipt of a request for reading data from or writing data in the floppy disk drive 17 from the application program 201, the FD driver 120 controls the requested read/write operation by issuing corresponding I/O commands respectively to the floppy disk controller 18 and the DMA controller 19.

The emulator 121 performs an emulating operation for the FD driver 120 and is adapted to trap the I/O commands issued from the FD driver 120 to the floppy disk controller 18 and the DMA controller 19, respectively. Instead of the FD driver 120, the emulator 121 controls the floppy disk controller 18 and the DMA controller 19 to execute the operation of reading data from or writing data in the floppy disk drive 17 specified by the command. The control feature of the emulator 121 will be described in greater detail later.

Figure 6:
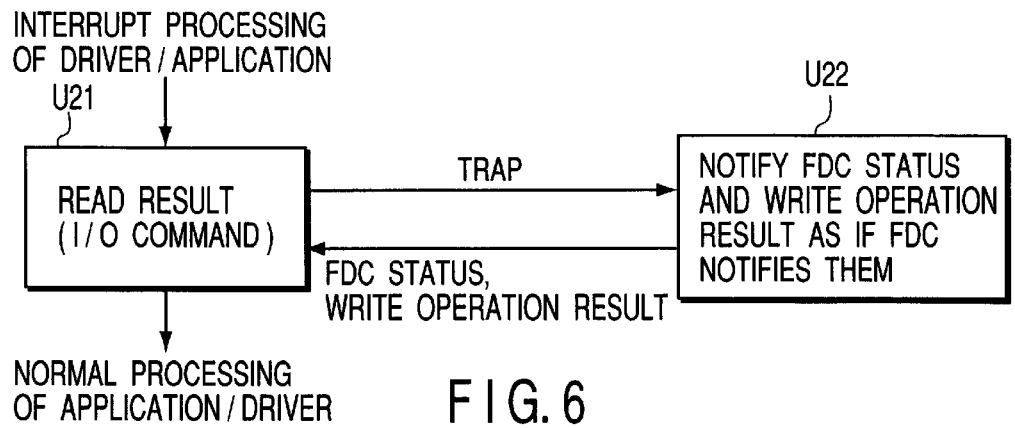
FIG. 6 is a schematic illustration of the relationship between an interrupt processing operation of a FD driver or an application program and a processing operation of a corresponding emulator in the second embodiment of the present invention.
Figure 7:
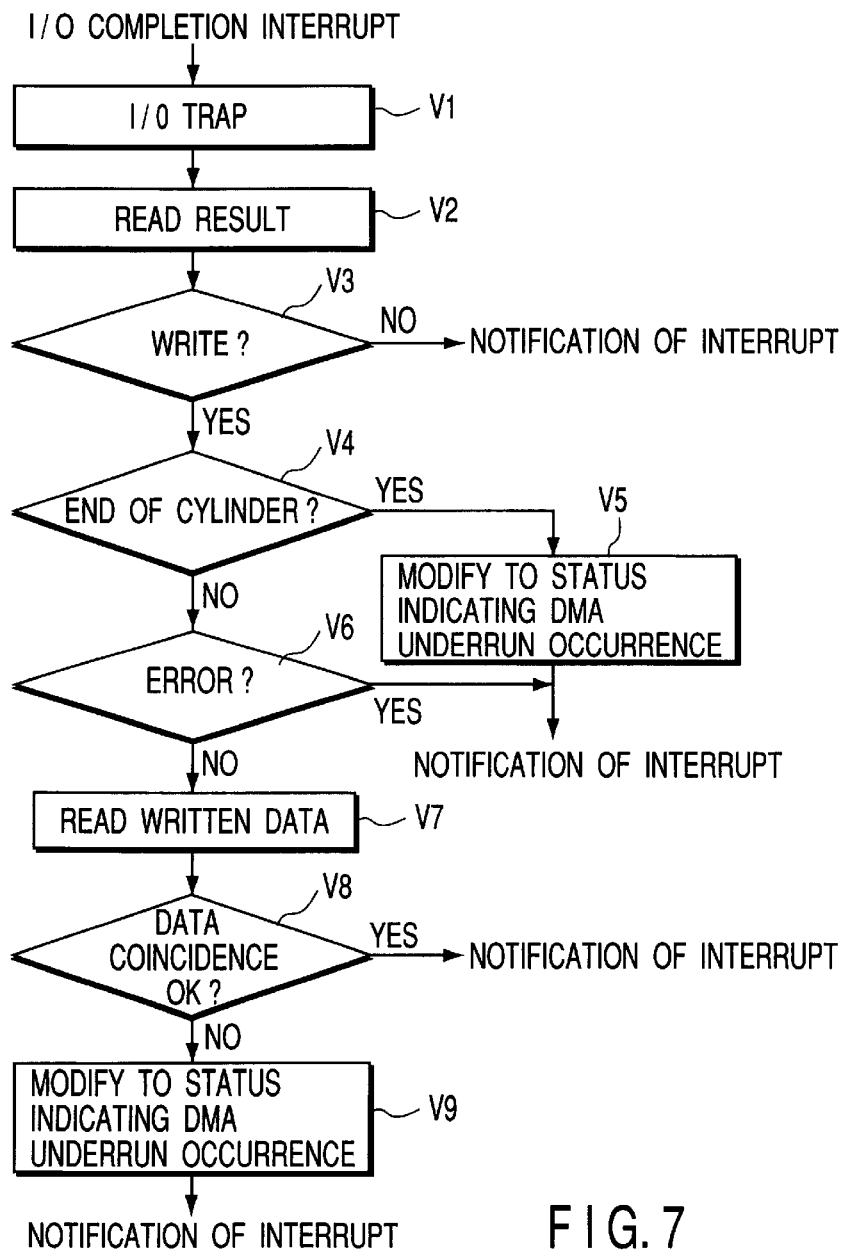
FIG. 7 is a flow chart illustrating the output operation of the emulator when the emulator traps the I/O command issued by the FD driver in an I/O completion interrupt processing operation in the second embodiment of the present invention.

Now, the operation of reading/writing data from/in the floppy disk drive 17 of the computer system having the above described configuration will be described below by referring to the flow charts of FIGS. 5 to 7.

Assume here that the application program 201 (see FIG. 4) stored in the main memory 12 and to be processed by the computer system has issued a request for reading/writing data from/ in the floppy disk drive 17 to the FD driver 120 via the OS 202.

The FD driver 120 issues corresponding I/O commands to be supplied respectively to the floppy disk controller 18 and the DMA controller 19 in order to fulfill the request. The I/O command issued to the floppy disk controller 18 specifies a command, a leading address (indicating a head, a cylinder and a sector) to be used for the read or write operation, a sector length to be used for the read or write operation and an EOT (End of Track) specifying a last sector of a track. The I/O command issued to the DMA controller 19 includes an amount of data to be transferred (number of bytes to be transferred) and a start address for the transfer of the main memory 12 (start address for the read or write operation).

Figure 5:
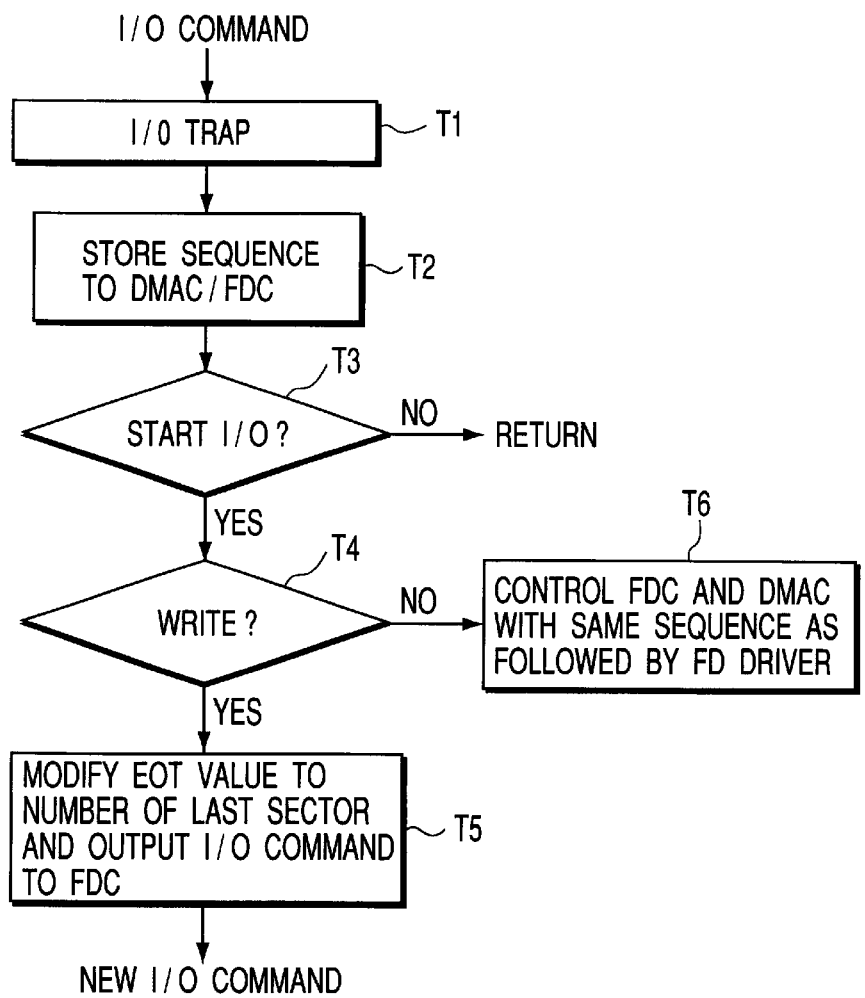
FIG. 5 is a flow chart illustrating the operation of the emulator when a write/read I/O command for a floppy disk is trapped in the second embodiment of the present invention.

When the corresponding I/O commands are issued from the FD driver 120 respectively to the floppy disk controller 18 and the DMA controller 19 in order to read data from or write data in the floppy disk drive 17, the emulator 121 (in other words, the CPU 11 for performing the emulating operation) traps the I/O commands (Step T1 of FIG. 5).

The emulator 121 stores the I/O sequence contained in each of the trapped I/O commands in a predetermined memory area of the main memory 12 after trapping the I/O commands (Step T2).

Then, the emulator 121 repeats the above operation until all the I/O commands issued to the floppy disk controller 18 and the DMA controller 19 are trapped and stored, i.e., until the requested operation of reading data from or writing data in the floppy disk drive 17 (the I/O start) is enabled (Step T3).

When all the I/O commands issued to the floppy disk controller 18 and the DMA controller 19 are trapped and stored, the CPU 11 interprets the commands and determines whether or not a write operation is specified (Step T4).

If it is not determined that the write operation is specified (i.e., if it is determined that the read operation is specified), the emulator 121 controls the floppy disk controller 18 and the DMA controller 19 with the sequence of the I/O command stored in the main memory, which is same as the sequence to be normally followed by the FD driver 120 (Step T6).

If, on the other hand, it is determined that the write operation is specified, the emulator 121 outputs a new write command which is transformed and produced from the original I/O command to the floppy disk controller 18 (Step T5).

In the Step T5, the emulator 121 determines whether or not the write operation specified by the I/O command involves a multitrack request (i.e., multitrack write request) which requires a switch from the front surface (head 0) to the rear surface (head 1) of the floppy disk on the same cylinder. If the multitrack request is involved, the emulator 121 divides the multitrack request into two single track requests (including a write request for a track on the head 0 side and a write request for a track on the head 1 side) and sequentially outputs corresponding commands. Additionally, the emulator 121 modifies an EOT value contained in the command for the floppy disk controller 18 to the last sector's number in sectors targeted for writing (transferring) data. Still additionally, when outputting a command to the floppy disk controller 18, the emulator 121 also outputs a corresponding command to the DMA controller 19. Thus, when the multitrack request is divided into single track requests, a corresponding command specifying a DMA transfer of the data to be written is output to the DMA controller 19 for each of the single track requests.

Then, the DMA controller 19 performs the operation of reading the data to be written with the number of bytes to be transferred as specified by the command from the emulator 121 and transferring them to the floppy disk controller 18 via the bus 13, while decrementing values of the DMA counter. On the other hand, the floppy disk controller 18 writes the data transferred by the DMA controller 19 on the specified area of the floppy disk mounted in the floppy disk drive 17 down to the end of the sector.

Upon completion of the operation of transferring the data to be written with the specified number of bytes to the floppy disk controller 18, the DMA controller 19 notifies the floppy disk controller 18 of the completion of the transfer. Then, the floppy disk controller 18 completes the operation of writing the data in the floppy disk drive 17.

It is to be noted that, before the above described process for writing data in the floppy disk drive 17, the emulator 121 causes original data to be stored in advance in the predetermined memory area of the main memory 12, like the case of the first embodiment (FIG. 2, Step S1).

Now, assume that the computer system of FIG. 1 suffers an extraordinarily heavy load and hence the transfer of the last byte of the last sector is made too late. In this case, the floppy disk controller 18 may try to write the byte data also in the sector located next to the right one. According to this embodiment, however, the EOT value has been modified to the last sector's number in sectors targeted for writing (transferring) data, not to a last sector's number of the track. If the last sector of the sectors targeted coincides with the sector indicated by the EOT, the floppy disk controller 18 deems that no next sector exists (i.e., no data can be written in the next sector) and hence declares EN (end of cylinder).

The floppy disk controller 18 stores the result of the write operation indicating EN or a successful completion in the data register 18b in the controller 18 and issues a write completion (I/O completion) interrupt request to the interrupt controller 23.

Upon receipt of the write completion interrupt request from the floppy disk controller 18, the interrupt controller 23 issues an interrupt signal to the CPU 11 and stores information indicating that the corresponding interrupt request has issued from the floppy disk controller 18 in a register in the controller 23.

Upon receipt of the interrupt signal from the interrupt controller 23, the CPU 11 detects that the corresponding interrupt request has issued from the floppy disk controller 18 by referring to the register in the interrupt controller 23. Subsequently, an interrupt processing operation is performed by the FD driver 120. More specifically, the FD driver 120 issues an I/O command for reading the contents of the status register 18a and the contents of the data register 18b in the floppy disk controller 18 (Step U21 in FIG. 6).

The emulator 121 traps the I/O command from the FD driver 120. Then, the emulator 121 notifies the floppy disk driver 120 of the status of the floppy disk controller 18 and the result of the write operation as if the floppy disk driver 120 were notified from the floppy disk controller 18 of the contents of status register 18a and the contents of the data register 18b (Step U22). Similar operation is applicable to the case where, upon receipt of a read completion interrupt request from the floppy disk controller 18, the FD driver 120 issues an I/O command for reading the contents of the status register 18a and the contents of the data register 18b in the floppy disk controller 18.

Now, the operation of the emulator 121 when it traps the I/O command issued from the FD driver 120 as a result of a write or read completion (I/O completion) interrupt, will be described in detail below.

The emulator 121 traps the I/O command issued from the FD driver 120 (Step V1), and then reads out the status of the floppy disk controller 18 and the result of the read or write completion stored in the status register 18a and the data register 18b of the floppy disk controller 18 (Step V2).

The emulator 121 determines whether the read-out result corresponds to a read completion result or a write completion result (Step V3).

If the read-out result corresponds to the read completion result the emulator 121 notifies the FD driver 120 of the status of the controller 18 and the read completion result as if the controller 18 had notified the FD driver 120 of the same.

If, on the other hand, the read-out result corresponds to the write completion result, the emulator 121 determines whether or not the write completion result indicates EN (end of cylinder) (Step V4) and, if so, it determines that DMA underrun has occurred and that no data must be written into a last sector of the track. Then, the emulator 121 modifies the write completion result indicating EN to a write completion result indicating DMA underrun occurrence and notifies the FD driver 120 of it along with the status of the floppy disk controller 18 (Step V5).

If, on the other hand, the write completion result does not indicate EN (end of cylinder), the emulator 121 checks for a write error (Step V6) and, if a write error is detected, the emulator 121 notifies the FD driver 120 of the write completion result and the status of the floppy disk controller 18.

If, to the contrary, no write error is detected, the emulator 121 issues a command for reading data to the floppy disk controller 18 and the DMA controller 19 to cause them to read the data written (Step V7). Then, the emulator 121 compares the data read out in Step V7 with the original data prior to being written in the floppy disk drive 17 as indicated in the description for FIG. 5 (Step V8).

If the comparison result in Step V8 indicates non-coincidence, the emulator 121 determines that DMA underrun has occurred and modifies the write completion result indicating the normal write completion to a write completion result indicating DMA underrun occurrence and notifies the FD driver 120 of it along with the status of the floppy disk controller 18 (Step V9).

If, on the other hand, the comparison result indicates coincidence, the emulator 121 notifies the FD driver 120 of the write completion result indicating the normal write completion and the status of the floppy disk controller 18.

In this way, in an operation of writing data in the floppy disk drive 17, the second embodiment can safely protect data of a sector located next to the last sector in sectors targeted for writing, from being destroyed even if DMA underrun has occurred, because the emulator 121 modifies the requested number (the last sector's number of the track) of EOT contained in the command (I/O command) issued to the floppy disk controller 18 to the last sector's number in sectors targeted.

Although the second embodiment has described the case where a request for reading/writing data from/in the floppy disk drive 17 is issued from the application program 201 to the FD driver 120 and an I/O command from the FD driver 120 is trapped by the emulator 121, the present invention is not limited to this case. For example, the present invention is applicable to a case where the application program 201 issues a request that is to be directly supplied to the floppy disk controller 18 and the DMA controller 19 is trapped by the emulator 121.

Moreover, it is possible to implement a system having both the functions described in the first embodiment and the functions described in the second embodiment.

The above described sequences for various processing operations can be stored in a storage medium (e.g., magnetic disk, optical disk, semiconductor memory) as computer-executable program code so that the computer (processor) may read them whenever it needs them for a processing operation. Such a program may be delivered from a computer to another computer by way of a communication medium.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

INDUSTRIAL APPLICABILITY

As described above in detail, according to the present invention, it is possible to efficiently avoid a situation where the data destruction in a disk such as a floppy disk is remained unknown.

Moreover, it is possible to efficiently check and secure data in sectors succeeding to the last sector of sectors targeted for writing, even if DMA underrun has occurred on the last byte of the last sector.

Moreover, it is possible to efficiently protect data in a sector located next to the last sector of sectors targeted for writing, from being destroyed, even if DMA underrun has occurred on the last byte of the last sector.

What is claimed is:

1. A data write control method for writing data onto a disk in response to a write request, comprising:
   storing data requested to be written from the write request in a storage area before writing;
   reading data from at least a succeeding sector located next to a last sector in sectors targeted for writing when the write request does not contain a designation for a last sector of a track on the disk;
   writing data requested to be written from the write request onto the disk;
   reading out the written data from the disk;
   comparing the written data read out from the disk with the data stored in the storage area so as to determine whether or not the data written onto the disk has been successfully written;
   reading out the data from the succeeding sector of the disk; and
   comparing the data read out from the succeeding sector after the writing with the data read out from the succeeding sector before the writing so as to determine whether or not the data in the succeeding sector has been destroyed.

2. The method according to claim 1, further comprising:
   recovering the data in the succeeding sector using the data read out from the succeeding sector before the writing, if the data in the succeeding sector has been destroyed.

3. The method according to claim 2, further comprising:
   reading out data from a sector located next to the succeeding sector of the disk, if the recovery has been successfully carried out; and
   comparing the data read out from the sector located next to the succeeding sector with data read out from the sector located next to the succeeding sector before the recovery so as to determine whether or not the data in the sector located next to the succeeding sector has been destroyed.

4. A data write control method for writing data onto a disk in response to a write request, comprising:
   trapping an input/output command for reading/writing data from/onto the disk; and
   modifying an EOT (End of Track) value specifying a last sector's number of a track in the input/output command to a last sector's number in sectors targeted for writing, if the input/output command corresponds to a write request, and outputting the input/output command to controller means for controlling the disk.

5. The method according to claim 4, further comprising:
   trapping a second input/output command for requiring a read/write completion result and obtaining the result from the controller means; and
   modifying the write completion result to a write completion result indicating a DMA underrun occurrence to be notified for the second input/output command, if the result corresponds to a write completion result indicating end of cylinder.

6. The method according to claim 4, further comprising:
   dividing the request into a plurality of single track write requests and sequentially outputting corresponding commands to the controller means, if the input/output command corresponds to a multitrack write request.

7. A data write control system for writing data onto a disk in response to a write request, comprising:
   means for storing data requested to be written from the write request in a storage area before writing;
   means for reading data from at least a succeeding sector located next to a last sector in sectors targeted for writing when the write request does not contain a designation for a last sector of a track on the disk;
   means for writing data requested to be written from the write request onto the disk;
   means for reading out the written data from the disk;
   means for comparing the written data read out from the disk with the data stored in the storage area so as to determine whether or not the data written onto the disk has been successfully written;
   means for reading out the data from the succeeding sector of the disk; and
   means for comparing the data read out from the succeeding sector after the writing with the data read out from the succeeding sector before the writing so as to determine whether or not the data in the succeeding sector has been destroyed.

8. The system according to claim 7, further comprising:
   means for recovering the data in the succeeding sector using the data read out from the succeeding sector before the writing, if the data in the succeeding sector has been destroyed.

9. The system according to claim 8, further comprising:
   means for reading out data from a sector located next to the succeeding sector of the disk, if the recovery has been successfully carried out; and
   means for comparing the data read out from the sector located next to the succeeding sector with data read out from the sector located next to the succeeding sector before the recovery so as to determine whether or not the data in the sector located next to the succeeding sector has been destroyed.

10. A data write control system for writing data onto a disk in response to a write request, comprising:
    means for trapping an input/output command for reading/writing data from/onto the disk; and
    means for modifying an EOT (End of Track) value specifying a last sector's number of a track in the input/output command to a last sector's number in sectors targeted for writing, if the input/output command corresponds to a write request, and outputting the input/output command to controller means for controlling the disk.

11. The system according to claim 10, further comprising:

means for trapping a second input/output command for requiring a read/write completion result and obtaining the result from the controller means; and means for modifying the write completion result to a write completion result indicating a DMA underrun occurrence to be notified for the second input/output command, if the result corresponds to a write completion result indicating end of cylinder.

12. The system according to claim 10, further comprising:

means for dividing the request into a plurality of single track write requests and sequentially outputting corresponding commands to the controller means, if the input/output command corresponds to a multitrack write request.

13. A storage medium storing computer-executable program code that performs data write control in writing data onto a disk in response to a write request, the program code comprising:

means for causing a computer to store data requested to be written from the write request in a storage area before writing;

means for causing a computer to read data from at least a succeeding sector located next to a last sector in sectors targeted for writing when the write request does not contain a designation for a last sector of a track on the disk;

means for causing a computer to write data requested to be written from the write request onto the disk;

means for causing a computer to read out the written data from the disk;

means for causing a computer to compare the written data read out from the disk with the data stored in the storage area so as to determine whether or not the data written onto the disk has been successfully written;

means for causing a computer to read out the data from the succeeding sector of the disk; and means for causing a computer to compare the data read out from the succeeding sector after the writing with the data read out from the succeeding sector before the writing so as to determine whether or not the data in the succeeding sector has been destroyed.

14. The storage medium according to claim 13, wherein the program code further comprises:

means for causing a computer to recover the data in the succeeding sector using the data read out from the succeeding sector before the writing, if the data in the succeeding sector has been destroyed.

15. The storage medium according to claim 14, wherein the program code further comprises:

means for causing a computer to read out data from a sector located next to the succeeding sector of the disk, if the recovery has been successfully carried out; and means for causing a computer to compare the data read out from the sector located next to the succeeding sector with data read out from the sector located next to the succeeding sector before the recovery so as to determine whether or not the data in the sector located next to the succeeding sector has been destroyed.

16. A storage medium storing computer-executable program code that performs data write control in writing data onto a disk in response to a write request, the program code comprising:

means for causing a computer to trap an input/output command for reading/writing data from/onto the disk; and means for causing a computer to modify an EOT (End of Track) value specifying a last sector's number of a track in the input/output command to a last sector's number in sectors targeted for writing, if the input/output command corresponds to a write request, and output the input/output command to controller means for controlling the disk.

17. The storage medium according to claim 16, wherein the program code further comprises:

means for causing a computer to trap a second input/output command for requiring a read/write completion result and obtain the result from the controller means; and means for causing a computer to modify the write completion result to a write completion result indicating a DMA underrun occurrence to be notified for the second input/output command, if the result corresponds to a write completion result indicating end of cylinder.

18. The storage medium according to claim 16, wherein the program code further comprises:

means for causing a computer to divide the request into a plurality of single track write requests and sequentially output corresponding commands to the controller means, if the input/output command corresponds to a multitrack write request.

* * * * *